United States Patent [19]
Sadler et al.

[11] Patent Number: 6,069,984
[45] Date of Patent: May 30, 2000

[54] METHOD AND APPARATUS FOR CORRECTING OPTICAL SPOT POSITION

[75] Inventors: John W. Sadler, Belmont; Dorsel N. Andreas, Menlo Park, both of Calif.

[73] Assignee: Hewlett-Packard Company, Palo Alto, Calif.

[21] Appl. No.: 08/999,018

[22] Filed: Dec. 29, 1997

[51] Int. Cl.[7] .............................. G06K 9/18; G06K 9/20; G06K 7/10; H04N 1/04
[52] U.S. Cl. ........................ 382/321; 382/183; 382/275; 382/312; 235/462; 358/474
[58] Field of Search .................... 382/183, 266, 382/275, 318, 321, 312; 235/462; 356/305, 328; 358/474, 488

[56] References Cited

U.S. PATENT DOCUMENTS

| | | | |
|---|---|---|---|
| 4,122,503 | 10/1978 | Allan | 360/78.05 |
| 4,538,181 | 8/1985 | Taylor | 348/205 |
| 4,626,907 | 12/1986 | Schedewie | 348/95 |
| 5,291,392 | 3/1994 | Gerber et al. | 700/56 |
| 5,479,006 | 12/1995 | Schultz | 250/214 LA |
| 5,525,810 | 6/1996 | Jewell et al. | 235/462.25 |
| 5,764,383 | 6/1998 | Saund et al. | 358/497 |
| 5,910,651 | 6/1999 | Ryvkin | 235/462.25 |
| 5,925,880 | 7/1999 | Young et al. | 250/252.1 |
| 5,930,411 | 7/1999 | Kojima et al. | 382/318 |

*Primary Examiner*—Phuoc Tran
*Assistant Examiner*—Daniel G. Mariam
*Attorney, Agent, or Firm*—Gordon Stewart

[57] ABSTRACT

A method and apparatus for producing a set of compensated commands for a spot position mechanism. A dimensioned grating is placed across the beam path and an image of the grating is generated. The image is analyzed and the pixel position of the grating edges is compiled. From this a list of grating edge distances is produced and used to generate observed edge positions. A line is fit and removed from the list to produce a list of observed errors. The observed errors are correlated to the proper position space and a set of positions errors is produced. The position errors are subtracted from the command positions to produce a set of correction positions. This set of corrected positions can be used to command the spot position mechanism. The positions might also be tabulated and referenced. Interpolation between the points can also be performed.

15 Claims, 5 Drawing Sheets

METHOD AND APPARATUS FOR CORRECTING OPTICAL SPOT POSITION

FIELD OF INVENTION

This invention relates to a method and apparatus for correcting the optical spot position of a scanning beam in order to compensate for general non-linearities in the scanning mechanism and optical setup. The method and apparatus uniquely calculates a set of position errors which are then subtracted from the positioning command for the scanning mechanism.

BACKGROUND OF THE INVENTION

Scanning image systems generally form a map of some optical characteristic of a surface of interest by moving a focused beam of light in a deliberate and repeatable pattern over the surface and measuring some response. The response is generally time correlated to the position of the scanning beam in order to form a map of the response with respect to its location on the surface. In instances where the features of interest are arranged systematically across the surface (i.e. in an array), it is important to be able to infer the position of the surface represented by each pixel of a surface scan. It is also important to have a high level of confidence that the pixel spacing is uniform within some tolerance dictated by the size of the features being scanned. The moving and optical components that position the scanning spot relative to the surface generally exhibit some systematic position errors. Such errors can be either dynamical (i.e. time dependent) or position dependent. Examples of time dependant errors include those which are a function of the scan profile being performed, the system response of the beam positioning apparatus, or errors due to a non-settled system. Examples of position dependant errors include those which are a function of the static alignment and shape of the scan lens, nonlinear properties of the spot positioning apparatus, or measurements performed at the extreme ends of the scanning system range. Generally, such errors can be categorized as reproducible and non-reproducible deviations from ideal behavior.

While prior systems have attempted to address such concerns, there still exists a need for an improved method and system which will allow systematic errors, regardless of their type or source, to be readily sensed, calibrated, and stored. The resulting compensations to remove the errors can then be applied at a later time to improve the linearity of a scan across the surface of interest.

SUMMARY OF THE INVENTION

The invention described herein measures the positioning linearity of a spot-surface positioning system by scanning a surface on which has been deposited a precisely dimensioned grating. In the shown embodiment, a glass chip is used which is mounted in a cartridge containing a dilute fluorescent dye solution. The fluorescent, scattered, or reflected light is used to create an image. The image is analyzed to calculate the positions of the grating edges in the scanned image, i.e. knowledge of the edge positions are derived by counting pixels resulting from the image of the grating. From these edge positions, the non-linearity error of the spot trajectory is determined. A corrected command can be applied directly, or a table of correction values can be generated and stored for later use. The correction values are thereafter used, either directly or after performing interpolation between the tabulated points, to correct command positions sent to the particular motion control circuit for positioning the beam. These corrections substantially improve the linearity of the system over presently known techniques.

Additionally, the method allows pre-compensation of the dynamics of a spot pointing mechanism provided that the system response of the mechanism is systematic or repeatable. The method is also capable of automation, therefore providing a self calibration feature for positioning mechanisms so equipped. Such automation allows interative application of the calibration technique to further refine the set of compensated commands.

Other advantages of this invention will become apparent to from the following description taken in conjunction with the accompanying drawings which set forth, by way of illustration and example, certain embodiments of this invention. The drawings constitute a part of this specification and include exemplary embodiments, objects and features of the present invention.

DETAILED DESCRIPTION OF THE PREFERRED EMBODIMENT

A preferred embodiment of the invention provides a method of compensating the commands to be sent by a spot positioning mechanism through use of a dimensioned grating and associated processing steps. The method can be used to provide a high degree of linearity thereby compensating for systematic errors which might occur in the spot position system due to time, position, and/or dynamically dependent sources of error. The resulting compensated spot positioning commands might be stored, thereby providing a system which is pre-calibrated before use. The commands might also be generated and/or refined via automated routines.

Figure 1:
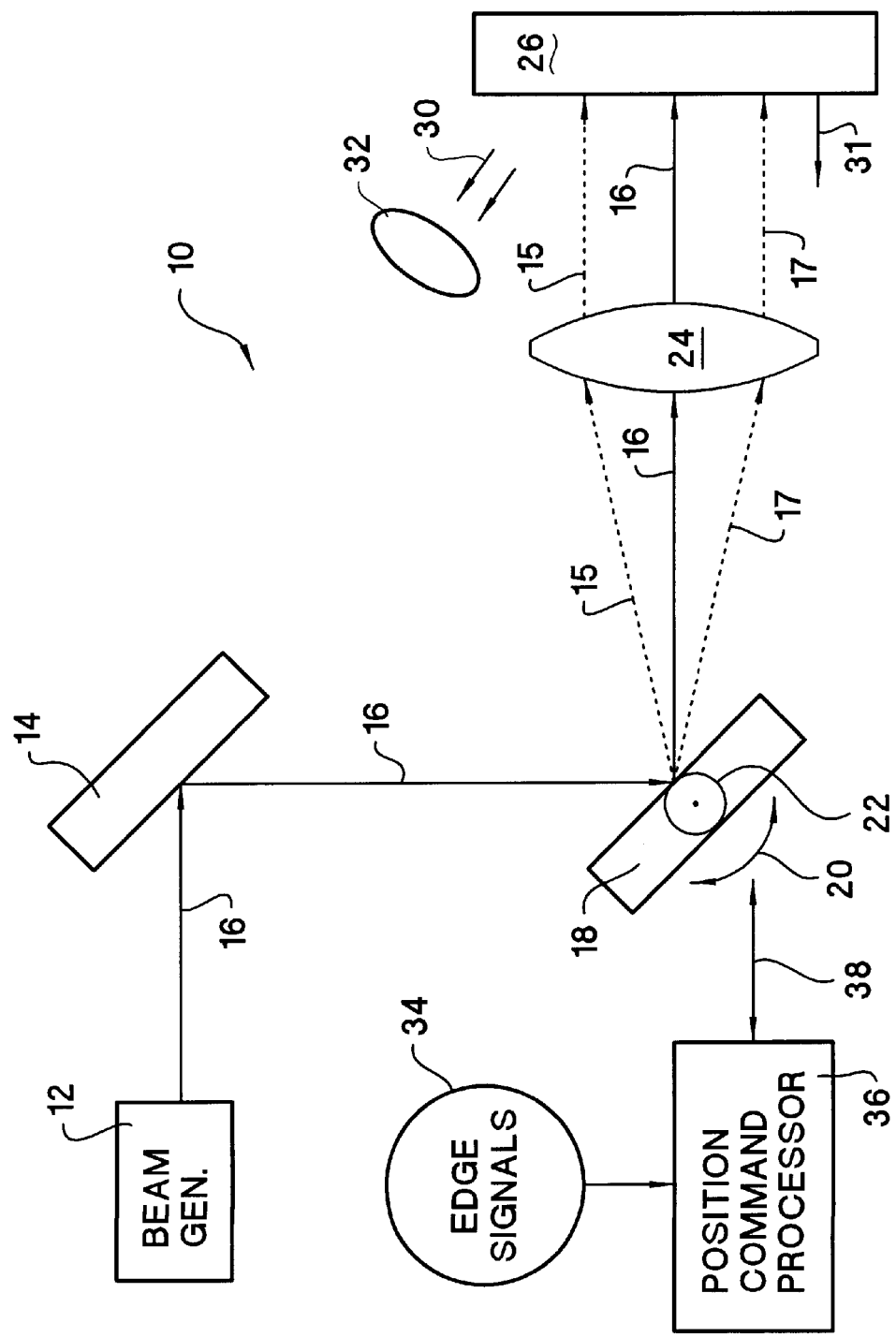
FIG. 1 shows a block diagram of a spot positioning and error correction apparatus.

FIG. 1 shows an example spot positioning system 10 which includes a beam generation device 12 and a first mirror 14. The beam 16 is reflected off mirror 14 and onto a second mirror 18 which is rotated as shown by arrows 20 via a precision motor 22 such as a galvanometer. The beam 16 is thereby reflected off mirror 18 and through a scan lens 24. Lens 24 is designed to focus and redirect the entering light so that it falls onto the scanning surface 26. The rotating mirror 18 steers the beam 16 as shown by dotted lines 15 and 17 to thereby scan or pass over the surface 26. Reflected light 30 coming off the surface 26 can be detected and measured by a sensing device such as a photo-multiplier tube 32. The photo-multiplier tube might include an optical train (not shown). Alternatively, light 31 can be reflected back through the system 10 for similar detection and measurement at any point along the system path. In the present system, this reflected light 30, 31 provides grating edge position signals which are fed into a position command processor 36 to produce imaging information. The imaging information is processed a set of compensated commands are generated and sent via path 38 to the motor 22.

Figure 2:
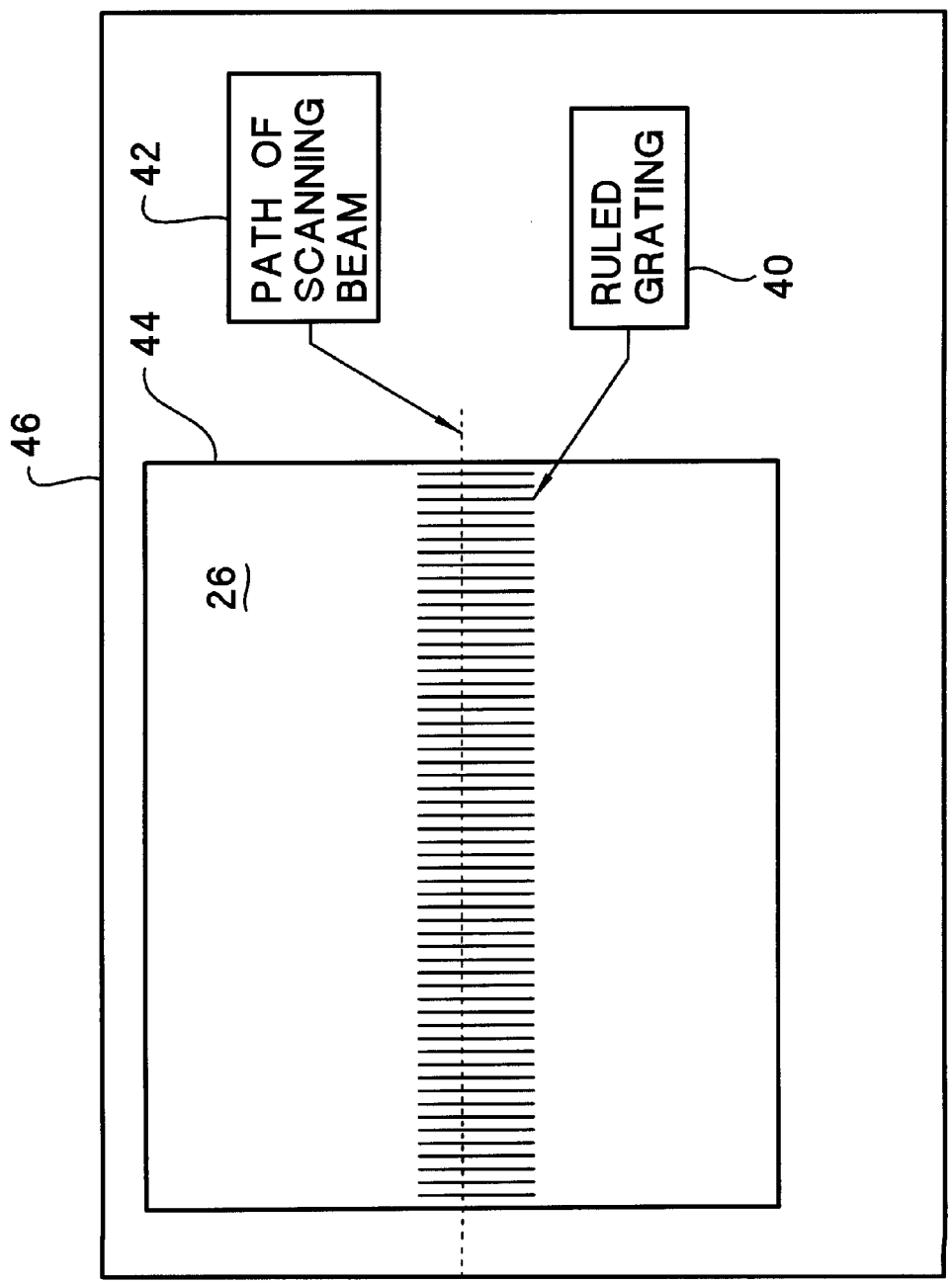
FIG. 2 shows the dimensioned grating used in FIG. 1 and the related path of the scanning beam which is used to generate the error correction values.

In the present invention, the position linearity of the system is measured by scanning a surface which has been deposited a precisely dimensioned grating. The spatial frequency of the grating should be high in comparison to the frequencies present in the particular error function of the spot positioning system. FIG. 2 shows a scanning surface 26 with a dimensioned chrome grating 40 deposited over the path which the scanning beam 42 passes. In the preferred embodiment, this surface 26 is a glass chip 44 mounted in a cartridge 46 containing a dilute fluorescent dye solution. With this arrangement, sensors can measure either reflected light from the chrome grating or fluorescent light from the spaces between the chrome rulings to create an image. By calculating the positions of the grating edges in the scanned image, the non-linearity error of the spot trajectory can be determined.

Figure 3:
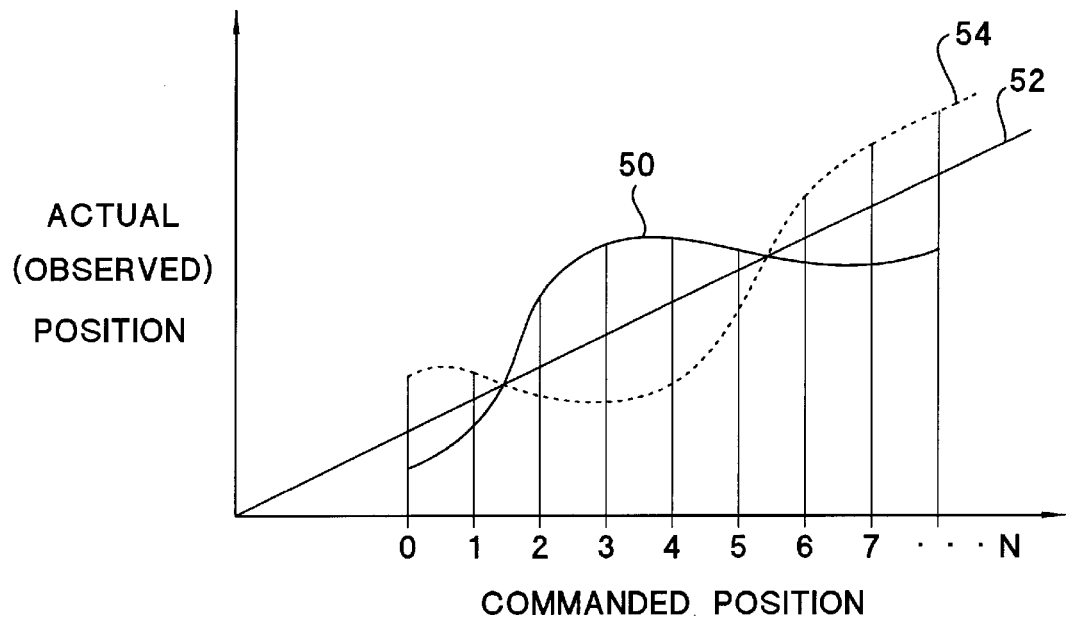
FIG. 3 shows a graph of commanded spot position versus the actual (observed) position.

FIG. 3 shows an example plot of commanded positions on the horizontal axis versus actual (observed) positions on the to vertical axis. While eight positions are shown, any number N could be used. In this particular example, line 52 represents a fitted straight line of the commanded position versus the actual (observed) position. Fitted line 52 might also be other shapes, i.e. curved. Such a line fit can be 15S achieved via a variety of techniques including for instance a least-squares-fit, or other such functions for performing a parametric fit. A fit of some other type of function to the profile can be used within the scope of the present invention, if for example, the scan profile is known to be something other than a line. In the present example, a linear scan profile is used and therefore a fit of the best line is derived. Removing the line leaves the non-linearities and noise (the residuals). The residuals can then be removed, via for example filtering, to leave only the low frequency parts. The solid curved line 50 representing the actual (observed) positions is shown starting below, passing above, and then ending below the fit line 52.

Figure 4:
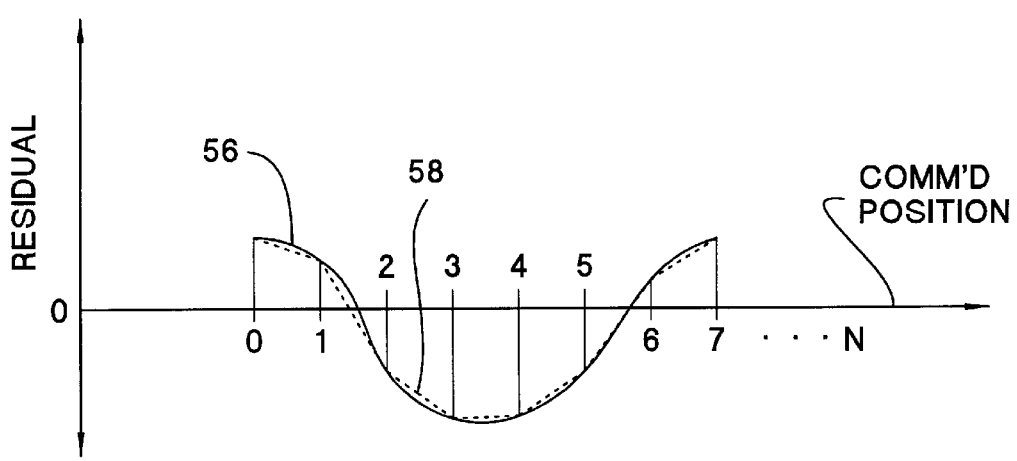
FIG. 4 shows a graph of the commanded spot position versus the calculated residual for each position.

In order to produce compensated commands which will produce a linear result, the residual values for the dotted line 54 are derived (and possibly tabulated). FIG. 4 shows a plot of these residual values on the vertical axis versus the commanded position on the horizontal axis. In particular, a function of the residuals is computed and the result is used to correct the position. For example, the position command might be corrected by using the negative of the low-pass filtered residuals. Additionally, if the spot is observed to be one count too far along at a given position, then the described method might command the controller to subtract one count at that position next time. For each position, the residual value is sent to the position controller and the resulting spot position approximates the linearity of fitted line 52. Yet another step might be employed which involves performing a straight-line interpolation between two commanded positions (as tabulated or otherwise) as shown by the dotted line 58. Such interpolation allows fewer command positions to be generated and/or stored, yet still provides sufficient linearity and precision.

Figure 5A:
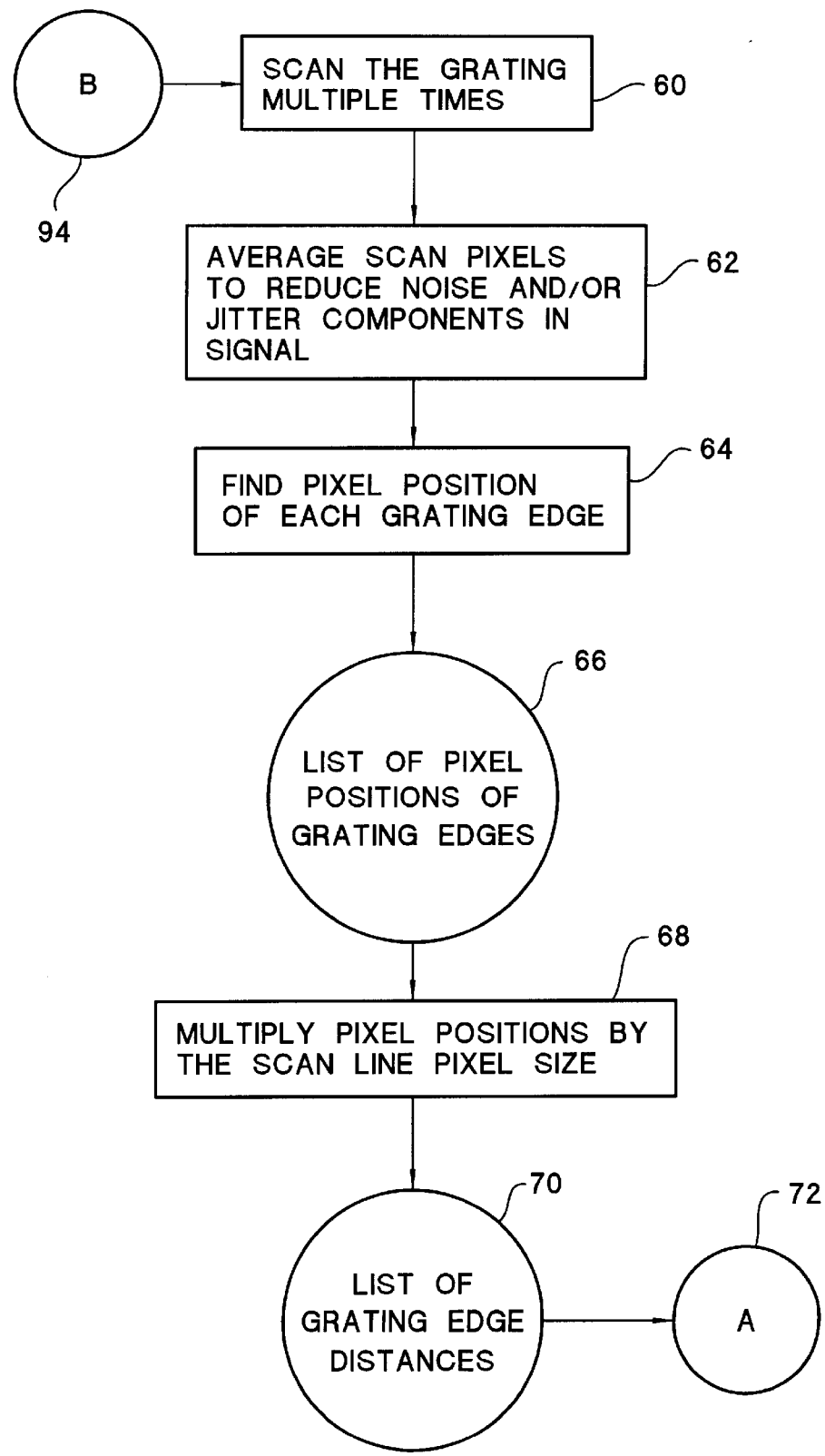
FIGS. 5(a)–(b) shows a flowchart of the steps used to calculate the final spot positions for output to the spot position controller.

FIG. 5(a) shows a flowchart of the general steps involved in deriving the table of compensated command positions. Step 60 shows the process of scanning the dimensioned grating multiple times to produce a series of scan pixels. While this multiple can be any number of times, the preferred embodiment performs hundreds of scans in order to ensure good data. Step 62 next shows the process of averaging the scan pixels for the multiple scans to reduce noise and/or jitter components in the resulting signal data. Step 64 shows the process of finding the pixel position for each grating edge. The disclosed process is intended to include and be able to handle both integer and non-integer (i.e. fractional) pixel position data. In the preferred embodiment, the positions are found by examining the averaged data set starting generally at the middle of the data and working outward to detect edges of the dimensioned grating. This technique allows the process to ignore conditions at the edge of the grating where the compensation process might be less accurate. The described process takes advantage of the known design spacing of the dimensioned grating to aid in eliminating spurious data. Step 64 results in a list of pixel positions of the grating edges as shown by 66. In step 68, the offsets are multiplied by the scan line pixel size to derive a list of grating edge distances 70.

Figure 5B:
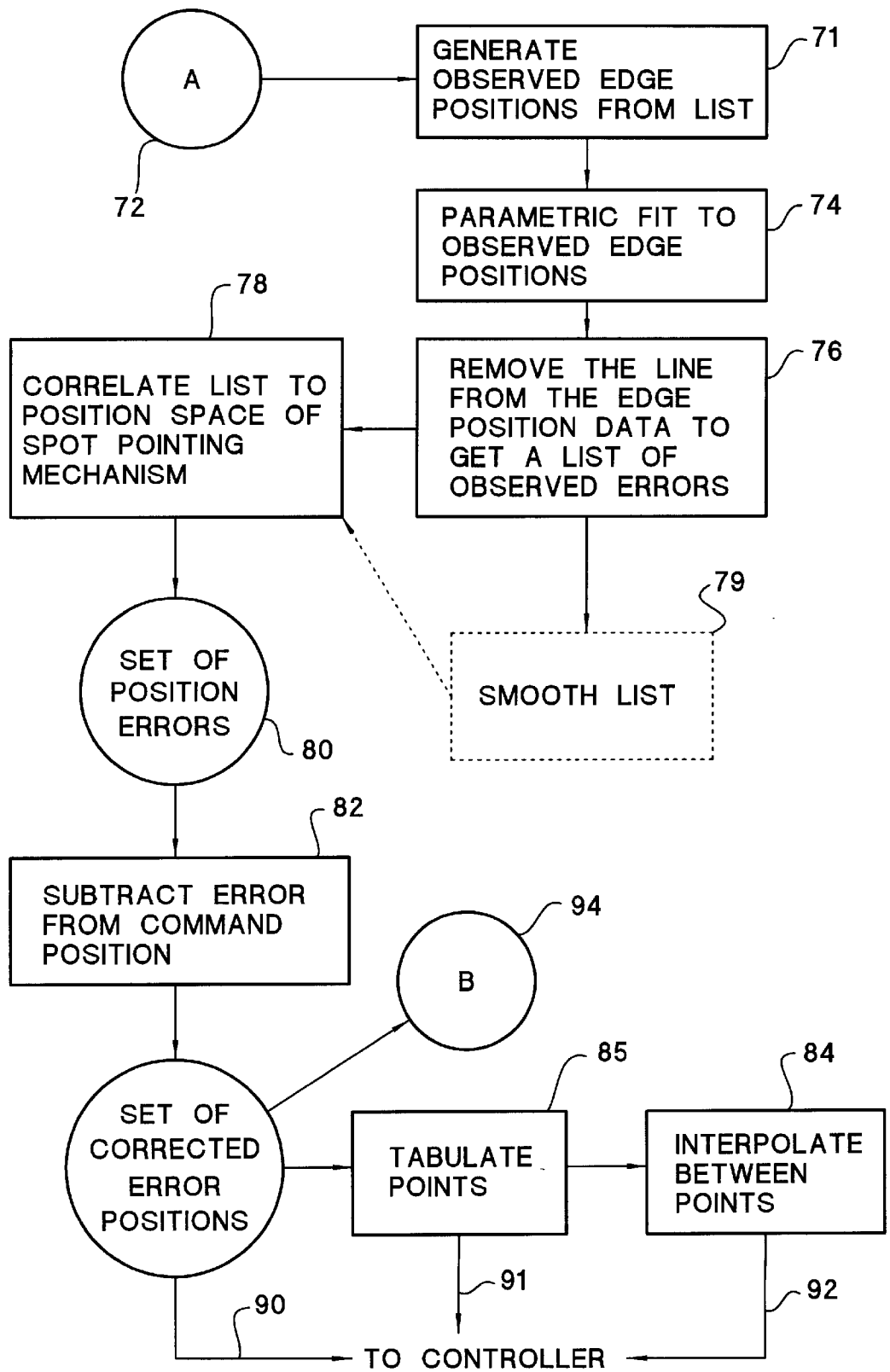

The chart is continued from 72 in FIG. 5(b). The list of grating edge distances 70 are thereafter used to generate a set of observed edge positions, as shown in step 71. One technique for achieving step 71 would include taking the first difference of the list of grating edge distances 70, but other techniques might similarly be used to produce the observed edge spacing positions. Step 74 next shows the process of performing a parametric fit to the observed edge positions. For a straight line (as in this example), a line fitting process might include a least-squares-fit. Other functions or techniques could also be used depending upon the data being fit. In step 76, the fit line is removed from the edge position data to produce a list of observed errors. The observed errors might optionally be smoothed as shown in dotted line step 79. This step might include, but is not limited to, such techniques as applying a low-pass filter or moving average to the list of data.

Step 78 shows the process of correlating the list from step 76 (or from step 79, if applied) to the position space of the spot pointing mechanism. In the preferred embodiment, this would be a digitally positioned galvanometer and scan lens system. This produces a set of position errors 80 at equal intervals in space. In the previous example plots, the number of command position intervals is shown as 8 (i.e. 0–7), but this number might extend out to N positions. The preferred embodiment divides the space into 16 intervals, but any number that achieves the desired performance will also suffice.

The overall spot positioning process next takes this set of position errors 80 and subtracts the error from the position command as shown in step 82. This produces a set of corrected positions 86 which might be used to directly command the controller as shown by arrow 90. While not required, the preferred embodiment tabulates and stores this set as shown in step 85. A table-lookup could then be used to send the corrected commands to the controller as shown by arrow 91. Alternatively, the corrections might be modeled with some parametric function, and then the function would be computed at each position to get the appropriate correction. Alternatively still, an interpolation routine as shown by step 84 can be applied to the data set to interpolate between any two given points, which might then be sent to the spot controller device as shown by arrow 92.

Further refinements of the corrected positions can be achieved by reapplying the method (or parts of the method) to the data set derived. For example, connecting step 94 shows the routine being looped back to step 60 in FIG. 5(a), which would then scan using the first order corrected command values, and so on for higher orders. Such reiterative refinements can add yet another level of precision to the corrected commands. Moreover, such reiterative techniques can easily be automated and performed by automatic calibration routines.

Overall, the disclosed invention is advantageous in that it allows significant improvement to the linearity of any spot positioning system without the added cost required to manufacture a system that has sufficient inherent linearity. Further the calibration can be performed in situ, or in the natural operating position of the mechanism, and can thereafter be repeated at later times in case various characteristics of the system change over time.

It is to be understood that while certain forms of the invention are illustrated, they are not to be limited to the to specific forms or arrangements of parts herein described and shown. It will be apparent to those skilled in the art that various changes may be made without departing from the scope of the invention and the invention is not to be considered limited to what is shown in the drawings and descriptions.

What is claimed is:

1. A method for generating at least one command which compensates for systematic errors in a spot positioning device having a scanning beam and scanning surface, the steps comprising:

(a) positioning a dimensioned grating with grating edges on the scanning surface;
   (b) generating scan pixel data corresponding to the beam path;
   (c) finding the pixel position of grating edges;
   (d) using the pixel positions to generate observed edge positions;
   (e) using the observed edge positions to produce a list of observed errors; and
   (f) generating a set of compensated commands from the list of observed errors; wherein step (d) further comprises:
      multiplying the pixel positions by the size of the scan pixel to produce a list of grating edge distances; and
      generating observed edge positions from the list of grating edge distances.

2. The method of claim 1, wherein the steps are reiterated to refine the set of compensated commands.

3. The method of claim 1, wherein after step (f) an additional step comprises:

(g) tabulating and storing the list of compensated commands.

4. The method of claim 3, wherein after step (g) an additional step comprises:

(h) interpolating between tabulated points.

5. A method for generating at least one command which compensates for systematic errors in a spot positioning device having a scanning beam and scanning surface, the steps comprising:

(a) positioning a dimensioned grating with grating edges on the scanning surface;
   (b) generating scan pixel data corresponding to the beam path;
   (c) finding the pixel position of grating edges;
   (d) using the pixel positions to generate observed edge positions;
   (e) using the observed edge positions to produce a list of observed errors; and
   (f) generating a set of compensated commands from the list of observed errors;
   wherein step (b) further comprises:
      scanning the beam path over the grating a plurality of times to generate scan pixel data; and
      averaging the plurality of scans to generate averaged scan pixel data corresponding to the beam path.

6. A method for generating at least one command which compensates for systematic errors in a spot positioning device having a scanning beam and scanning surface, the steps comprising:

(a) positioning a dimensioned grating with grating edges on the scanning surface;
   (b) generating scan pixel data corresponding to the beam path;
   (c) finding the pixel position of grating edges;
   (d) using the pixel positions to generate observed edge positions;
   (e) using the observed edge positions to produce a list of observed errors; and
   (f) generating a set of compensated commands from the list of observed errors;
   wherein step (c) further comprises:
      examining the scan pixel data starting at the middle of the data and working outward to detect grating edges to produce a list of pixel positions of the grating edges.

7. The method of claim 1, wherein step (e) further comprises:

fitting a line to the observed edge positions; and
   removing the line from the observed edge position data to produce a list of observed errors.

8. The method of claim 1, wherein step (f) further comprises:

correlating the list of observed errors to the position space of the spot positioning device to produce a set of position errors;
   subtracting the position error corresponding to a desired command position to produce a compensated command for the spot positioning device.

9. The method of claim 1, wherein step (e) further comprises:

fitting and removing a line from the observed edge positions to produce a list of observed errors; and
   performing a smoothing operation on the list of observed errors.

10. The method of claim 9, wherein the smoothing operation includes a low pass filter.

11. A method for generating a set of compensated commands which correct for systematic errors in a spot positioning device having a scanning beam and scanning surface, the steps comprising:

positioning a dimensioned grating with grating edges on the scanning surface;
    scanning the beam path over the grating a plurality of times to generate scan pixel data;
    averaging the multiple scans to generate averaged scan pixel data corresponding to the beam path;
    finding the pixel position of grating edges to produce a list of pixel positions of the grating edges;
    multiplying the pixel positions by the size of the scan pixel to produce a list of grating edge distances;
    generating observed edge positions from the list of grating edge distances;
    fitting a line to the observed edge positions;
    removing the line from the observed edge position data to produce a list of observed errors;
    correlating the list to the position space of the spot positioning device to produce a set of position errors;

subtracting the position error corresponding to a desired command position to produce a set of compensated commands.

12. The method of claim 11, wherein an additional step is added after the last, comprising:

tabulating and storing the set of compensated commands.

13. The method of claim 12, wherein an additional step is added, comprising: interpolating between the tabulated commands.

14. An apparatus for generating a set of compensated commands which correct for systematic errors in a spot positioning device having a scanning beam and scanning surface, the apparatus comprising:

a beam generator, a spot positioning device which steers the generated beam across a beam path;

a dimensioned grating device positioned in the beam path and producing a grating edge signal;

a sensing device which receives the grating edge signals;

a position command processor which takes the grating edge signals and generates compensated commands for the spot positioning device:

wherein the position command processor performs the following steps:

(a) finding the pixel position of each grating edge;

(b) using the pixel positions to generate observed edge positions;

(c) using the observed edge positions to produce a list of observed errors; and (d) generating a set of compensated commands from the list of observed errors wherein step (b) further comprises:

multiplying the pixel positions by the size of the scan pixel to produce a list of grating edge distances; and generating observed edge positions from the list of grating edge distances.

15. The method of claim 1, wherein the position command processor reiterates the steps to refine the set of compensated commands.

* * * * *